(12) United States Patent
Muro et al.

(10) Patent No.: US 11,714,411 B2
(45) Date of Patent: Aug. 1, 2023

(54) AUTONOMOUS TRAVELING WORK MACHINE

(71) Applicant: HONDA MOTOR CO., LTD., Tokyo (JP)

(72) Inventors: Keiji Muro, Wako (JP); Naoki Kameyama, Wako (JP); Hideaki Shimamura, Wako (JP); Runa Kaneko, Wako (JP); Ryota Hisada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 562 days.

(21) Appl. No.: 16/981,033

(22) PCT Filed: Mar. 19, 2018

(86) PCT No.: PCT/JP2018/010747
§ 371 (c)(1),
(2) Date: Sep. 15, 2020

(87) PCT Pub. No.: WO2019/180765
PCT Pub. Date: Sep. 26, 2019

(65) Prior Publication Data
US 2021/0064036 A1     Mar. 4, 2021

(51) Int. Cl.
*G05D 1/02* (2020.01)
*G05D 1/00* (2006.01)
(Continued)

(52) U.S. Cl.
CPC ........... *G05D 1/0088* (2013.01); *G01C 22/00* (2013.01); *G01S 19/42* (2013.01); *G05D 1/0212* (2013.01);
(Continued)

(58) Field of Classification Search
CPC .. A01D 2101/00; A01D 34/008; G01S 19/42; G05D 1/0088; G05D 1/0212;
(Continued)

(56) References Cited

U.S. PATENT DOCUMENTS

2015/0072663 A1* 3/2015 Chande ................... H04W 4/02
455/414.1
2017/0322562 A1* 11/2017 Churavy ............. H03M 13/156
(Continued)

FOREIGN PATENT DOCUMENTS

JP  2001-209429      8/2001
WO  2017/177929 A1  10/2017

OTHER PUBLICATIONS

Japanese Office Action dated Sep. 21, 2021, with English translation, 7 pages.
(Continued)

*Primary Examiner* — Hunter B Lonsberry
*Assistant Examiner* — Matthew J. Reda
(74) *Attorney, Agent, or Firm* — Rankin, Hill & Clark LLP (57) ABSTRACT

To make it possible to correct a current position detected by an autonomous traveling work machine to the correct position with a simple configuration. A robot lawn mower includes a first position detecting unit for detecting a current position by using odometry and a second position detecting unit for detecting a current position by using an image capture. When position detection accuracy of both of the first and second position detecting units decreases to less than or equal to a predetermined value, the robot lawn mower is controlled to travel to either of zones Z1 and Z2 in which the position detection accuracy of the second position detecting unit is relatively high, and when the robot lawn mower moves to either of the zones Z1 and Z2, a (Continued)

current position used for autonomous traveling is corrected to the current position detected by the second position detecting unit.

20 Claims, 6 Drawing Sheets

(51) Int. Cl.
*G01C 22/00* (2006.01)
*G01S 19/42* (2010.01)
*A01D 34/00* (2006.01)
*A01D 101/00* (2006.01)

(52) U.S. Cl.
CPC ......... *G05D 1/0231* (2013.01); *A01D 34/008* (2013.01); *A01D 2101/00* (2013.01); *G05D 2201/0201* (2013.01)

(58) Field of Classification Search
CPC .. G05D 1/0231; G05D 1/0251; G05D 1/0272; G05D 1/0274; G05D 2201/0201; G05D 2201/0208; G05B 2219/45098
See application file for complete search history.

(56) References Cited

U.S. PATENT DOCUMENTS

2018/0246518 A1* 8/2018 Vogel .................. G05D 1/0234
2019/0256093 A1* 8/2019 Horii ..................... B60W 30/17
2020/0402256 A1* 12/2020 Kobayashi ........... G05D 1/0251

OTHER PUBLICATIONS

European Search Report dated Jun. 18, 2021, 9 pages.
International Search Report, dated May 6, 2018, 2 pages.
Written Opinion of the International Searching Authority dated Jun. 5, 2018 in PCT/JP2018/010747, 3 pages.
International Preliminary Report on Patentability, dated Oct. 1, 2020, 6 pages.

* cited by examiner

AUTONOMOUS TRAVELING WORK MACHINE

TECHNICAL FIELD

The present invention relates to an autonomous traveling work machine that autonomously travels in a working area.

BACKGROUND ART

There has been an autonomous traveling work machine that detects a relative position from a station (hereinafter referred to as a relative position) by means of odometry and autonomously travels in a working area based on the relative position. Odometry is a technique of detecting a relative position from a reference position based on the amount of rotation of wheels, wheel diameter, tread and the like. Accordingly, a longer movement distance results in an increased error, decreasing the position detection accuracy. Thus, an unmanned carrier vehicle that is further provided with an ID tag detector (corresponding to a sensor) to correct the amount of deviation of the current position such as based on absolute position information from an ID tag (see Patent Literature 1, for example).

CITATION LIST

Patent Literature

Patent Literature 1
Japanese Patent Laid-Open No. 2001-209429

SUMMARY OF INVENTION

Technical Problem

To ensure return to the station, a possible method is to track wire buried in the ground. However, this requires burying the wire, and a wireless autonomous traveling work machine cannot be operated like that. Also, in the case of an autonomous traveling work machine using wire, it is likely that wheel tracks are produced along the wire, increasing the positional deviation such as due to spinning of wheels.

Also, the method of using an ID tag requires that the ID tag be buried in the floor or stuck on the wall. If there are surrounding objects and noise blocking the communication in the movement area, the impossibility of receiving information of the ID tag may increase the positional deviation. If the positional deviation is significant, it is impossible to return to the station and correct (e.g., reset) the odometry to the correct position.

Thus, it is an objective of the present invention to make it possible to correct a current position detected by an autonomous traveling work machine to the correct position with a simple configuration.

Solution to Problem

To achieve the above objective, an aspect of the present invention provides an autonomous traveling work machine that detects a current position by a first detecting means for detecting the current position and a second detecting means for detecting the current position by a different method from the first detecting means, and autonomously travels in a working area based on the detected current position, the autonomous traveling work machine being characterized by including: a zone identifying unit for identifying a zone in which position detection accuracy of the second detecting means is relatively high, a travel controlling unit for controlling the autonomous traveling work machine to travel to the zone identified by the zone identifying unit when position detection accuracy of both of the first and second detecting means decreases to less than or equal to a predetermined value; and a position correcting unit for correcting a current position used for autonomous traveling to the current position detected by the second detecting means when the autonomous traveling work machine moves to the zone.

In the above configuration, the autonomous traveling work machine is characterized in that the autonomous traveling work machine includes a holding unit for holding position detection accuracy data in which a position and position detection accuracy of the second detecting means at the position are associated, and the zone identifying unit identifies the zone based on the position detection accuracy data.

Also, in the above configuration, the autonomous traveling work machine is characterized in that the travel controlling unit controls the autonomous traveling work machine to travel to the zone identified by the zone identifying unit when position detection accuracy of both of the first and second detecting means continues being less than or equal to a predetermined value.

Also, in the above configuration, the autonomous traveling work machine is characterized in that the zone identifying unit identifies a plurality of the zones, and the travel controlling unit identifies a distance from the current position of the autonomous traveling work machine to each zone, and controls the autonomous traveling work machine to travel to a nearest zone of the plurality of the zones.

Also, in the above configuration, the autonomous traveling work machine is characterized in that the zone identifying unit identifies a plurality of the zones, and the travel controlling unit identifies an area of each zone, and controls the autonomous traveling work machine to travel to a zone with a largest area of the plurality of the zones.

Also, in the above configuration, the autonomous traveling work machine is characterized in that the first detecting means is a relative position detecting means for detecting a relative position with respect to a reference position. Also, in the above configuration, the autonomous traveling work machine is characterized in that the relative position detecting means is odometry or a non-contact sensor.

Also, in the above configuration, the autonomous traveling work machine is characterized in that the travel controlling unit controls the autonomous traveling work machine to travel to a nearer one of the zone and a station used as the reference position for the first detecting means. Also, in the above configuration, the autonomous traveling work machine is characterized in that the travel controlling unit controls the autonomous traveling work machine to travel toward a center of the zone. Also, in the above configuration, the autonomous traveling work machine is characterized in that the second detecting means is an image capturing means or a GPS sensor.

Advantageous Effect of Invention

According to the aspect of the present invention, when position detection accuracy of both of first and second detecting means decreases to less than or equal to a predetermined value, the autonomous traveling work machine is controlled to travel to a zone in which position detection accuracy of the second detecting means is relatively high, and when the autonomous traveling work machine moves to the zone, a current position used for autonomous traveling is corrected to a current position detected by the second detecting means, so that the current position detected by the autonomous traveling work machine can be corrected to the correct position with a simple configuration.

DESCRIPTION OF EMBODIMENTS

The following describes embodiments of the present invention with reference to the drawings.

First Embodiment

Figure 1:
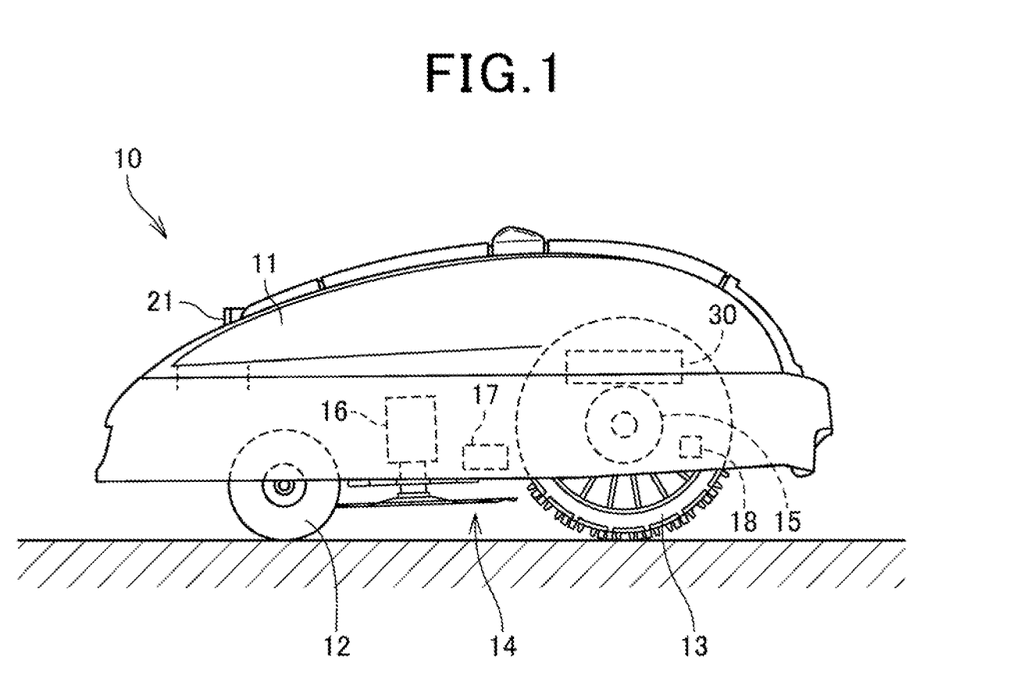
FIG. 1 is a side view of a robot lawn mower according to a first embodiment of the present invention.

FIG. 1 is a side view of a robot lawn mower according to a first embodiment of the present invention.

A robot lawn mower 10 is an autonomous traveling work machine that autonomously travels in a working area, which is a lawn mowing area, in a wireless manner, and is hereinafter referred to as a lawn mower 10.

The lawn mower 10 includes a housing 11, left and right front wheels 12 provided at a front part of the housing 11, left and right rear wheels 13 provided at a rear part of the housing 11, and a work unit 14 provided at a lower central part of the housing 11. The work unit 14 is a cutting blade disc provided with a cutting blade, and can cut lawns when the cutting blade disc is rotationally driven.

The lawn mower 10 includes, inside the housing 11, left and right travel motors 15 for separately driving the left and right rear wheels 13, a work unit driving motor 16 for driving the work unit 14, a battery 17 for supplying operational electrical power to each unit of the lawn mower 10, a wheel speed sensor 18 for detecting rotational speed of the left and right rear wheels 13, which are drive wheels, and an electrical unit 30.

Figure 2:
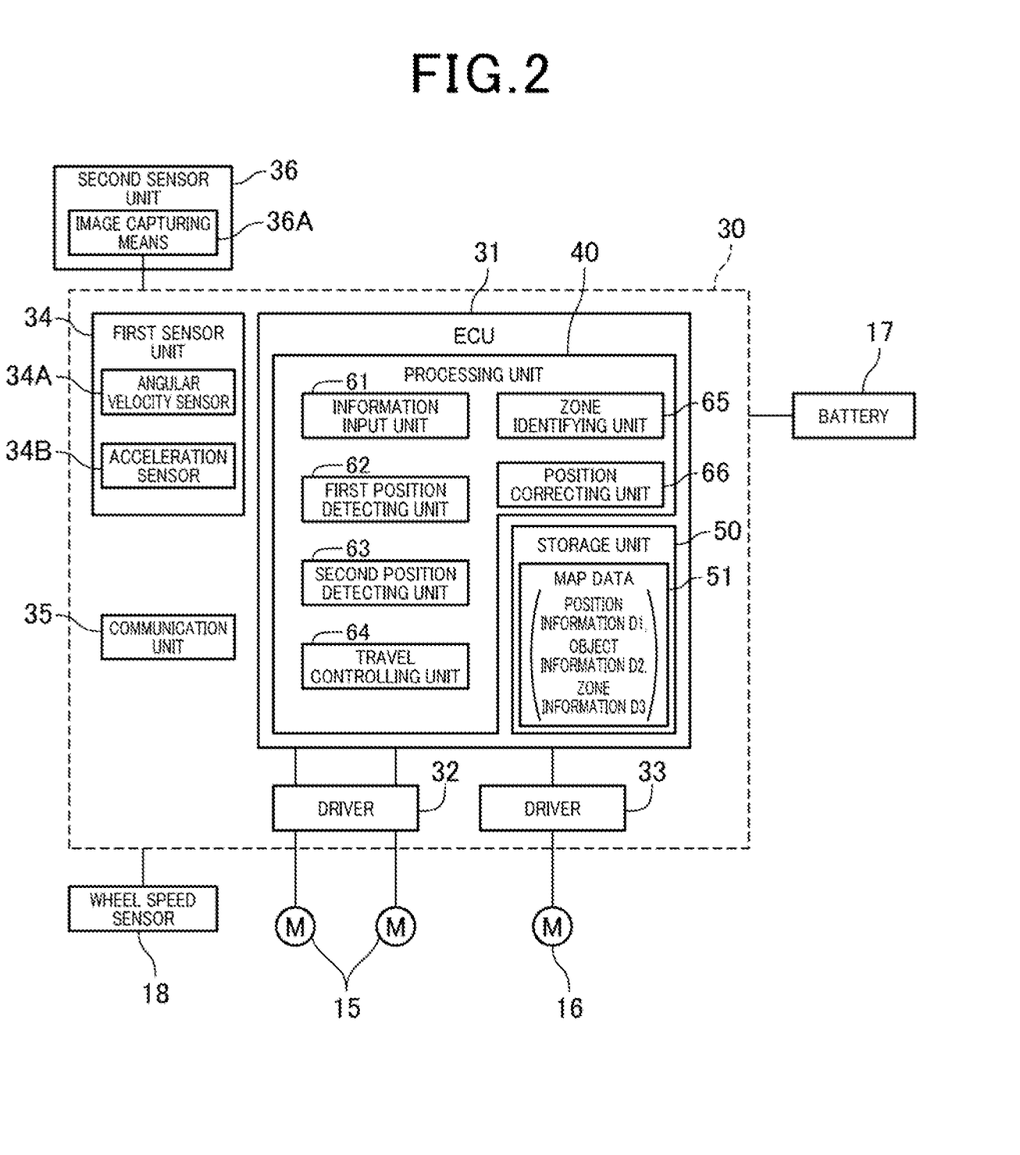
FIG. 2 is a block diagram of the lawn mower.

FIG. 2 is a block diagram of the lawn mower 10.

As shown in FIG. 1 and FIG. 2, the electrical unit 30 includes an electronic component such as an ECU (Electronic Control Unit) 31. In this embodiment, the electrical unit 30 includes, in addition to the ECU 31, drivers 32 and 33 for generating drive signals for the motors 15 and 16, a first sensor unit 34 for detecting movement of the lawn mower 10 other than the wheels, and a communication unit 35 for inputting and outputting various information.

The driver 32 separately controls the rotation of the left and right travel motors 15 according to signals received from the ECU 31. The driver 33 controls the rotation of the work unit driving motor 16 according to signals received from the ECU 31.

The first sensor unit 34 includes an angular velocity sensor 34A for detecting the angular velocity of the lawn mower 10 and an acceleration sensor 34B for detecting the acceleration of the lawn mower 10. The ECU 31 identifies the traveling direction of the lawn mower 10 from a detection result of the angular velocity sensor 34A, and identifies the moving speed of the lawn mower 10 from a detection result of the acceleration sensor 34B. The sensors 34A and 34B are sensors used such as when the ECU 31 (a first position detecting unit 62, which will be described later) detects the current position by means of odometry.

Further, the lawn mower 10 includes an image capturing means 36A for capturing images outside (in this configuration, forward of) the lawn mower 10 as a second sensor unit 36 used for detecting the current position of the lawn mower 10. The image capturing means 36A can employ various known cameras capable of capturing static images or moving images. Also, the number of cameras may be one or more, or there may be a stereo camera consisting of two cameras.

The communication unit 35 sends and receives information to/from an external device via wireless communication under control of the ECU 31. The communication unit 35 is, for example, a communication module for performing short-range wireless communication such as Bluetooth (registered trademark), IrDA, or Wi-Fi (registered trademark).

The ECU 31 is composed of a microcomputer including a processing unit 40 such as a CPU (Central Processing Unit) and a storage unit 50 (a holding unit) such as a RAM (Random Access Memory) or a ROM (Read Only Memory). The storage unit 50 holds data such as map data 51 about the working area and control programs.

The processing unit 40 functions as an information input unit 61, a first position detecting unit 62, a second position detecting unit 63, a travel controlling unit 64, a zone identifying unit 65, and a position correcting unit 66 by executing control programs stored in the storage unit 50. Note that any of the information input unit 61, the first position detecting unit 62, the second position detecting unit 63, the travel controlling unit 64, the zone identifying unit 65, and the position correcting unit 66 may be composed of hardware such as an analog circuit.

Before describing each unit of the processing unit 40, the map data 51 will be described.

Figure 3:
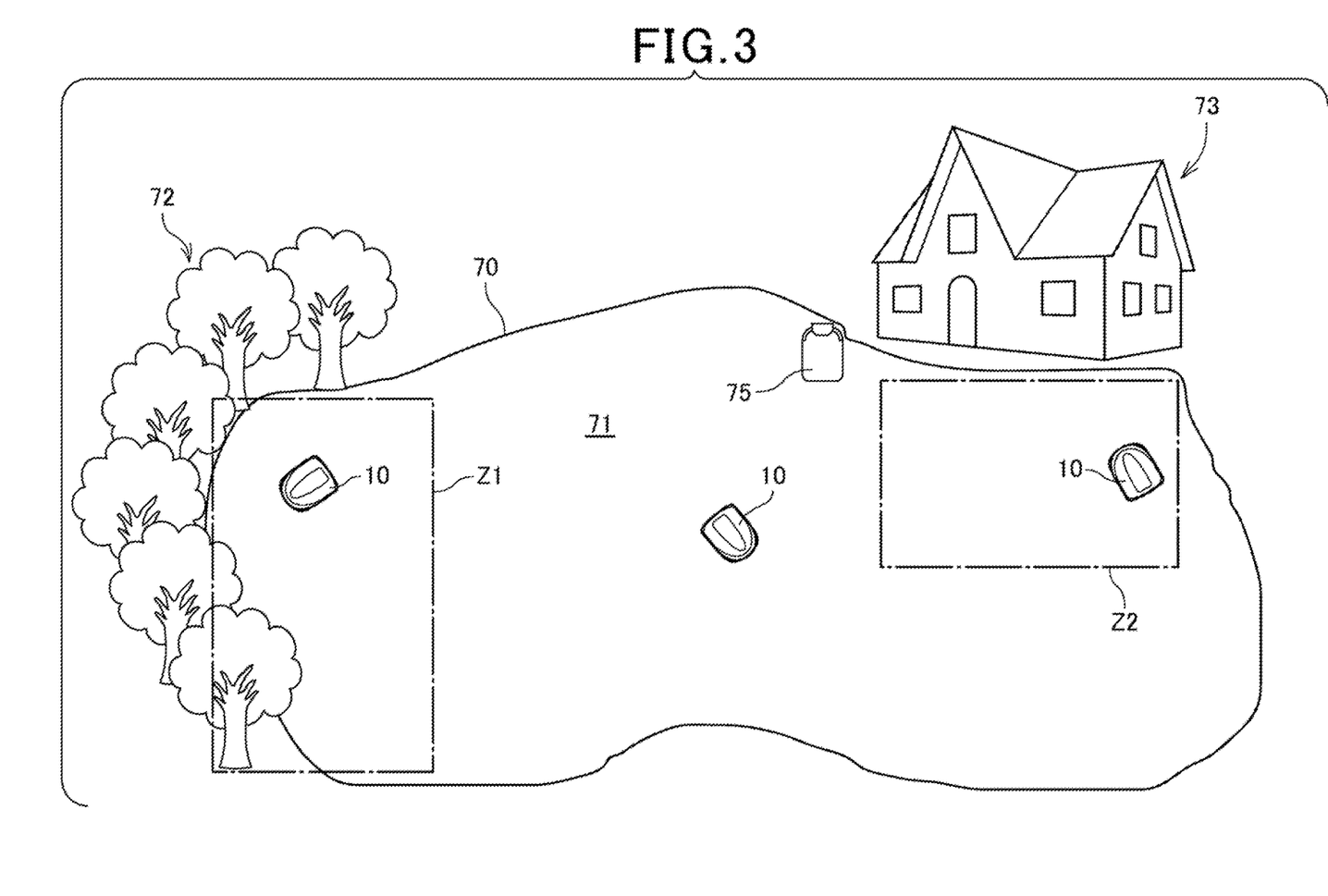
FIG. 3 is a diagram illustrating an example of a working area.

FIG. 3 is a diagram illustrating an example of a working area. In FIG. 3, a region enclosed by a solid line 70 is a working area (hereinafter indicated with a reference numeral 71).

There may be trees, buildings and the like inside and outside the working area 71. FIG. 3 illustrates a case in which there are trees (hereinafter referred to as a first object 72) on the left of the working area 71 and a building (hereinafter referred to as a second object 73) on the upper right of the working area 71. Also, in the working area 71 shown in FIG. 3, the position of a station 75 for housing the lawn mower 10 is indicated as well as the lawn mower 10 traveling in the working area 71.

The map data 51 is information used by the lawn mower 10 to travel in the working area 71, and in this embodiment includes positional information D1 indicating the working area 71, object information D2 indicating objects (the first object 72 and the second object 73) present inside and outside the working area 71, and position detection accuracy data D3 indicating position detection accuracy of the second position detecting unit 63 using the image capturing means 36A. The position detection accuracy data D3 is data in which each position in the working area 71 and the position detection accuracy of the second position detecting unit 63 at the position are associated. By referencing the position detection accuracy data D3, zones Z1 and Z2, which are regions where the position detection accuracy of the second position detecting unit 63 is high, can be easily identified.

Note that the zone Z1 is a region that is particularly close to the first object 72, and is a region where the current position of the lawn mower 10 can be accurately detected by the image capturing means 36A because the positional relationship between the lawn mower 10 and the first object 72 is apparent when photographed. Also, the zone Z2 is a region that is particularly close to the second object 73, and is a region where the current position of the lawn mower 10 can be accurately detected by the image capturing means 36A because the positional relationship between the lawn mower 10 and the second object 73 is apparent when photographed.

The position detection accuracy data D3 described above may be created by a user or the like, or may be automatically created based on a result of automatically collecting the position detection accuracy of the second position detecting unit 63 by the ECU 31 during a test run of the lawn mower 10.

The information input unit 61 shown in FIG. 2 inputs user instructions via an operational panel (not shown) provided on the lawn mower 10, inputs various information from an external device via the communication unit 35, and inputs information from other portions of the lawn mower 10. The information input unit 61 is used to acquire the map data 51 or update the map data 51 stored in the storage unit.

The first position detecting unit 62 functions as a relative position detecting means (corresponding to a first detecting means) for detecting a relative position corresponding to a reference position as the current position of the lawn mower 10 by means of odometry, which is a technique of estimating the current position such as from the amount of rotation of wheels. More specifically, the first position detecting unit 62 arithmetically acquires the distance by which the lawn mower 10 has moved based on a detection result of the wheel speed sensor 18. The first position detecting unit 62 can also detect the turning angle of the lawn mower 10 based on the rotational difference between the left and right rear wheels 13.

Further, the first position detecting unit 62 accurately identifies the traveling direction of the lawn mower 10 from a detection result of the angular velocity sensor 34A, and accurately identifies the moving speed of the lawn mower 10 from a detection result of the acceleration sensor 34B. Then, based on the identified information, the first position detecting unit 62 detects, as the current position, a relative movement distance from a predetermined reference position.

Note that the specific calculation method and the like for the odometry can employ various known operations.

The reference position for the odometry is set at the position of the station 75 (FIG. 3), for example. The station 75 is in this embodiment configured as a charging station having a charging function for charging the battery 17 of the lawn mower 10, but may not have the charging function.

The second position detecting unit 63 functions as a second detecting means for detecting the current position by a different method from the first position detecting unit 62, and detects the current position of the lawn mower 10 by using an image captured by the image capturing means 36A. More specifically, the second position detecting unit 63 performs image analysis on an image captured by the image capturing means 36A to extract an object in the captured image, and determines whether the extracted object matches with either of the first object 72 and the second object 73 in the object information D2 in the map data 51. If so, the second position detecting unit 63 identifies the position where the extracted object is captured in the image, and extracts positional information indicating the position from the positional information D1 in the map data 51.

Note that the operation of detecting the current position by using the captured image can employ various known operations.

The positional information indicating the current position detected by the first position detecting unit 62 and the second position detecting unit 63 is in a corresponding relationship with the positional information D1 in the map data 51.

The travel controlling unit 64 controls the left and right travel motors 15 such that the lawn mower 10 travels in the working area 71 defined in the positional information D1 in the map data 51 by using the current position detected by the first position detecting unit 62. Meanwhile, the travel controlling unit 64 also drives the work unit driving motor 16 to perform the lawn cutting work.

Also, the travel controlling unit 64 controls the lawn mower 10 to travel toward the station 75 by using positional information of the station 75 included in the map data 51 when the remaining capacity of the battery 17 becomes less than or equal to a predetermined value. When the lawn mower 10 moves to the station 75, the charging of the battery 17 is started.

When the lawn mower 10 moves to the station 75, the position correcting unit 66 performs an operation of correcting the current position detected by the first position detecting unit 62 (corresponding to a current position used for travel control) to the positional information of the station 75 included in the map data 51 (this operation is also referred to as a reset operation). The position correcting unit 66 also performs an operation of correcting the current position detected by the first position detecting unit 62 to the current position detected by the second position detecting unit 63 (this operation is included in the reset operation) during a position correcting operation, which will be described later.

In general, the position detection accuracy based on odometry decreases as the movement distance increases. Accordingly, if the travel control is performed based only on the current position detected by the first position detecting unit 62, the positional deviation becomes larger as the movement distance increases.

If the positional deviation is significant, it may be impossible to return to the station 75. On the other hand, the position detection accuracy of the second position detecting unit 63 is not necessarily high at a position where the position detection accuracy of the first position detecting unit 62 decreases. Thus, in this embodiment, the following position correcting operation is performed.

Figure 4:
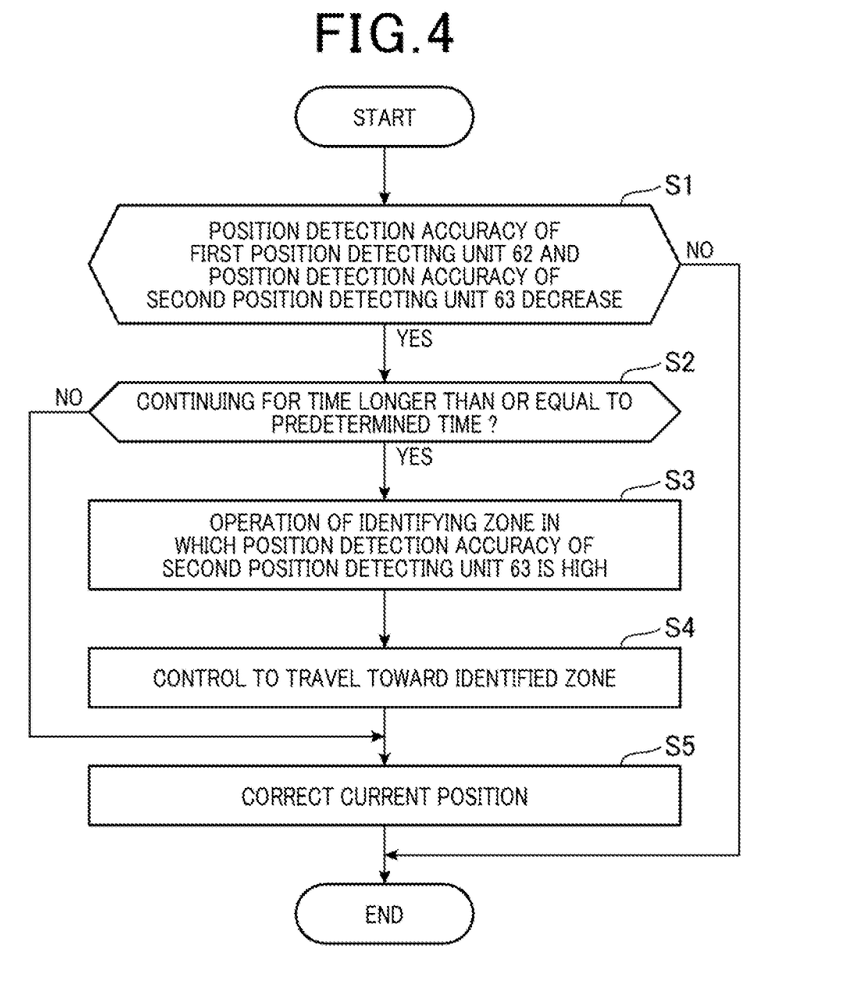
FIG. 4 is a flow chart illustrating a position correcting operation.

FIG. 4 is a flow chart illustrating a position correcting operation. Note that the position correcting operation is an operation that is repeatedly performed while the lawn mower 10 travels in the working area 71 during work.

The ECU 31 determines whether the position detection accuracy of the first position detecting unit 62 (=position detection accuracy based on the first sensor unit 34) and the position detection accuracy of the second position detecting unit 63 (=position detection accuracy based on the second sensor unit 36) have decreased to less than or equal to a predetermined value by the travel controlling unit 64 (step S).

Since the position detection accuracy of the first position detecting unit 62 decreases in accordance with the travel distance, it is determined that the position detection accuracy has decreased to less than or equal to the predetermined value when the travel distance from the previous reset operation exceeds a predetermined threshold, for example. However, there is no limitation thereto, and the slip ratio of the lawn mower 10 may be constantly measured so that it is determined that the position detection accuracy has decreased to less than or equal to the predetermined value such as when the slip ratio becomes greater than or equal to a threshold (when a large slip occurs) or when the number of large slips exceeds a threshold.

Also, the position detection accuracy of the second position detecting unit 63 is based on image recognition accuracy or the like, and can be detected such as by using known calculation methods for calculating image recognition accuracy. In this embodiment, it is determined that the position detection accuracy has decreased to less than or equal to the predetermined value when a detected value of the position detection accuracy becomes lower than a predetermined threshold.

Note that the position detection accuracy of the first position detecting unit 62 and the second position detecting unit 63 can be calculated by using various known detection methods.

If the determination in step S is YES, the flow proceeds to the operation of step S2. If the determination in step S1 is NO, the flow ends. Note that, if the position detection accuracy of the first position detecting unit 62 using the odometry is less than or equal to the predetermined value while the position detection accuracy of the second position detecting unit 63 exceeds the predetermined value, the traveling position used for autonomous traveling may be corrected to the current position detected by the second position detecting unit 63.

In step S2, the ECU 31 determines whether the position detection accuracy of the first position detecting unit 62 and the second position detecting unit 63 continues decreasing for a time longer than or equal to a predetermined time by the travel controlling unit 64.

The predetermined time here is set to a time longer than a period of time for which the position detection accuracy of the second position detecting unit 63 momentarily decreases due to a special event such as entry of direct sunlight into the image capturing means 36A, for example.

If the determination in step S2 is YES, the flow proceeds to the operation of step S3. If the determination in step S2 is NO, the flow proceeds to the operation of step S5.

In step S3, the ECU 31 performs an operation of identifying a zone in which the position detection accuracy of the second position detecting unit 63 is high by the zone identifying unit 65.

In the example shown in FIG. 3, zones Z1 and Z2 are identified by referencing the position detection accuracy data D3. If a plurality of zones Z1 and Z2 are identified, the ECU 31 arithmetically identifies the distance from the current position of the lawn mower 10 to each of the zones Z1 and Z2 by the travel controlling unit 64 to identify the nearest zone of the zones Z1 and Z2.

Upon identifying the zone in step S3, the ECU 31 controls the lawn mower 10 to travel toward the zone identified by the travel controlling unit 64 (step S4), and then proceeds to the operation of step S5. Note that, in addition to controlling the lawn mower 10 to move to the identified zone, the travel control in step S4 involves controlling the direction of the lawn mower 10 to change such that the objects used for identifying the current position (the first object 72 and the second object 73) are included in an image captured by the image capturing means 36A when the objects are not included in it.

In step S5, the ECU 31 performs an operation of detecting the current position by the second position detecting unit 63 and correcting the current position detected by the first position detecting unit 62 to the current position detected by the second position detecting unit 63 (the reset operation). The actions of the position correcting operation have been described above.

As described above, in this embodiment, the zone identifying unit 65 identifies a zone in which the position detection accuracy of the image capturing means 36A, which functions as a position sensor, is relatively high, and the travel controlling unit 64 controls the lawn mower 10 to travel to the zone identified by the zone identifying unit 65 when the position detection accuracy of both of the first position detecting unit 62 (first detecting means) and the second position detecting unit 63 (second detecting means) decreases to less than or equal to a predetermined value. Further, the position correcting unit 66 corrects the current position used for autonomous traveling to the current position detected by the second position detecting unit 63 when the lawn mower 10 moves to the zone.

According to these configurations, the current position based on odometry can be corrected to the correct position without returning to the station 75. Therefore, there is no need to employ the configuration of providing wire or an ID tag in the ground or on the wall so as to ensure return to the station 75, and the current position detected by the lawn mower 10 can be corrected with a simple configuration, preventing the impossibility to return to the station 75.

Also, the storage unit 50 holds the position detection accuracy data D3 in which each position in the working area 71 and the position detection accuracy of the second position detecting unit 63 at the position are associated. Then, the zone identifying unit 65 identifies the above-mentioned zone based on the position detection accuracy data D3. This makes it possible to easily identify the zone.

Also, the travel controlling unit 64 controls the lawn mower 10 to travel to the zone identified by the zone identifying unit 65 when the position detection accuracy of both of the first and second position detecting units 62 and 63 continues being less than or equal to a predetermined value. This can prevent the movement to the zone every time the position detection accuracy temporarily decreases, improving convenience.

Further, when the zone identifying unit 65 identifies a plurality of zones, the travel controlling unit 64 identifies the distance from the current position of the lawn mower 10 to each zone, and controls the lawn mower 10 to travel to the nearest zone. This can minimize the error occurring before reaching the zone, enabling a heightened probability of entering the zone.

Second Embodiment

Figure 5:
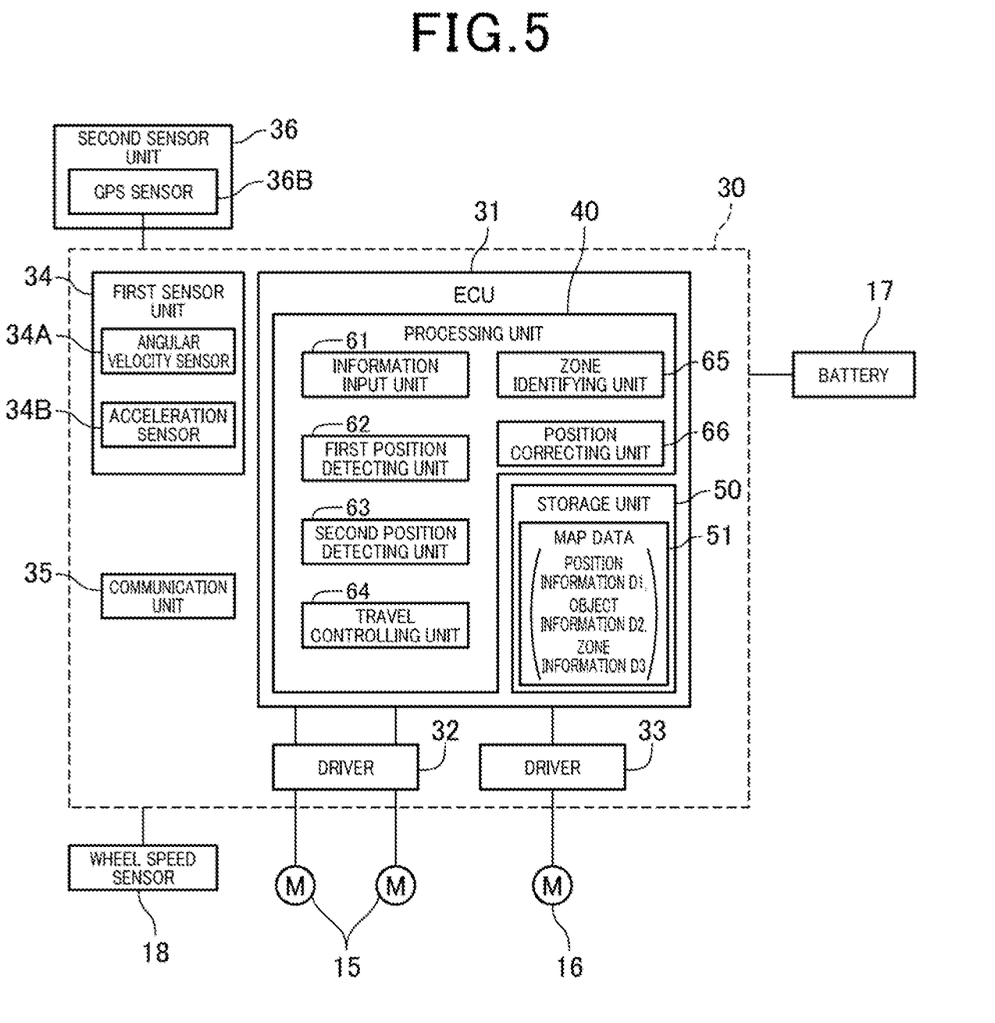
FIG. 5 is a block diagram of a lawn mower according to a second embodiment.

FIG. 5 is a block diagram of a lawn mower 10 according to a second embodiment.

The second embodiment is different from the first embodiment in that a GPS (Global Positioning System) sensor 36B is used for the second sensor unit 36. Note that components similar to those in the first embodiment are shown with the same reference numerals, and overlapping descriptions will be omitted.

Figure 6:
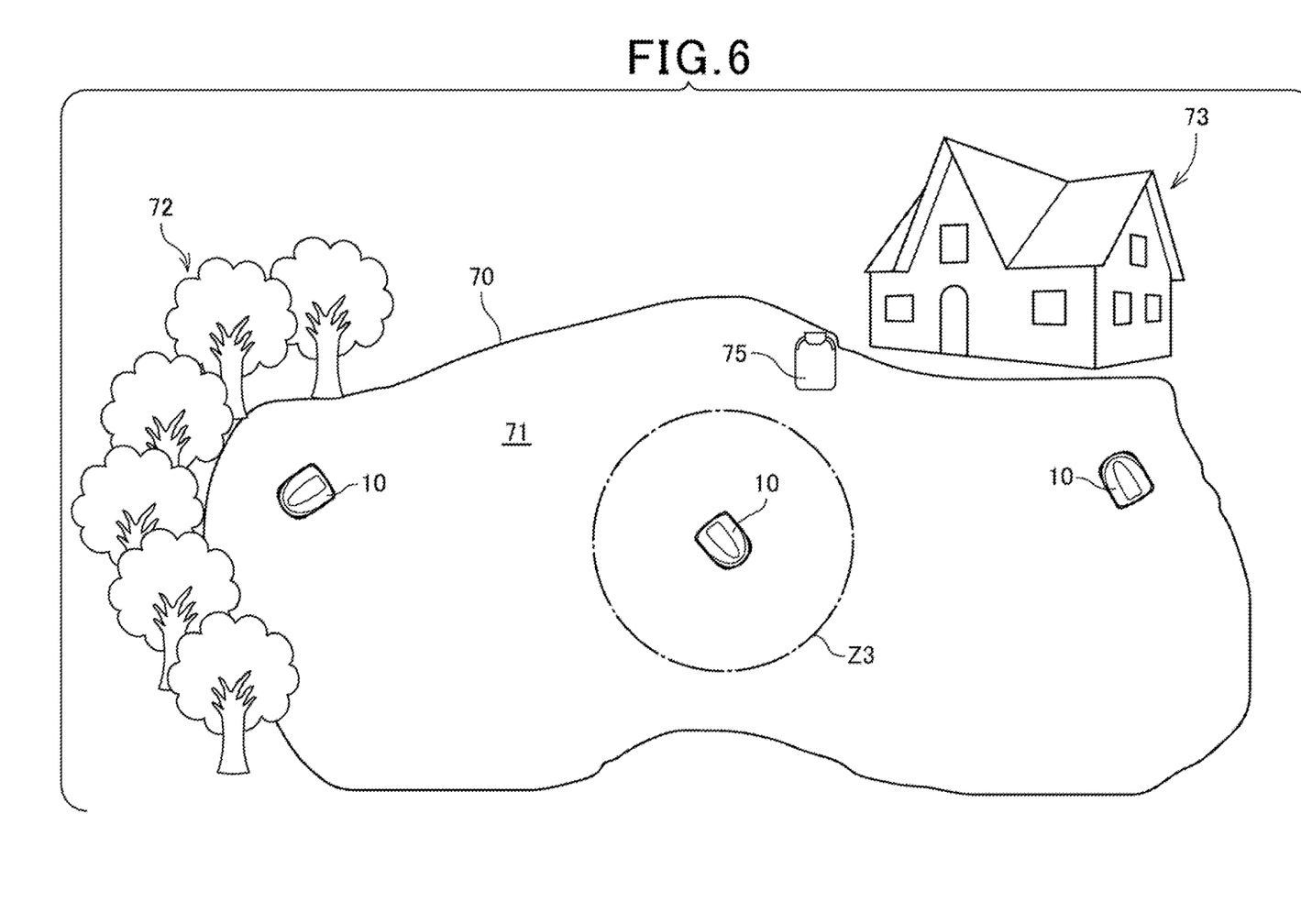
FIG. 6 is a diagram illustrating an example of the working area.

FIG. 6 is a diagram illustrating an example of the working area 71.

The GPS sensor 36B receives electromagnetic waves from GPS satellites. Accordingly, in the shadow of the first object 72 and the second object 73 present inside and outside the working area 71, the position detection accuracy decreases due to the impossibility to receive the electromagnetic waves or a decreased number of captured GPS satellites. For that reason, in the case of the second position detecting unit 63 using the GPS sensor 36B, the position detection accuracy is higher at a more distant position from the first object 72 and the second object 73.

FIG. 6 illustrates an example where the zone identifying unit 65 identifies a zone Z3 distant from the first object 72 and the second object 73 in the working area 71 as a region in which the position detection accuracy of the second position detecting unit 63 is high.

In the second embodiment, the travel controlling unit 64 controls the lawn mower 10 to travel to the zone Z3 when the position detection accuracy of both of the first and second position detecting units 62 and 63 continuously decreases to less than or equal to a predetermined value. In this manner, various effects can be obtained such as that the current position based on odometry can be corrected to the correct position with a simple configuration, as with the first embodiment.

Note that, in each of the above-described embodiments, when the zone identifying unit 65 identifies a plurality of zones, the lawn mower 10 may be controlled to travel to the zone with the largest area. In this case, even if a positional deviation occurs due to the error occurring before reaching the zone, the probability of entering the zone can be heightened.

Also, if the station 75 is at a position nearer than the zone, the travel controlling unit 64 may move the lawn mower 10 to the station 75. In this case, the current position can be reset at the station 75.

Further, the travel controlling unit 64 may control the lawn mower 10 to travel toward the center of the zone. In this case, even if a positional deviation occurs due to the error occurring before reaching the zone, the probability of entering the zone can be heightened.

Also, although each of the above-described embodiments has illustrated an example where the present invention is applied to the wireless lawn mower 10 without using area wire provided along the periphery of the working area 71 or the like, there is no limitation to this configuration, and the present invention may also be applied to a lawn mower 10 having a function to identify the working area 71 by using area wire, a marker or the like.

Also, the first sensor unit 34 used for detecting the current position based on odometry and the second sensor unit 36 used for detecting the current position without using odometry are not limited to the above-described sensors.

For example, the first position detecting unit 62 may use a non-contact sensor such as an optical flow sensor (also referred to as a relative speed detection sensor) or a gyro sensor to detect a relative position with respect to the position of the station or the like. Also in the case of using an optical flow sensor or the like, an increased movement distance causes an increased error as with the case of using odometry.

Also, although an example where the first position detecting unit 62 is a relative position detecting means for detecting a relative position with respect to a reference position has been illustrated, there is no limitation thereto, and other known configurations for detecting the current position may be applied.

Also, although each of the above-described embodiments has illustrated an example where the present invention is applied to the lawn mower 10, there is no limitation thereto, and the present invention is widely applicable to autonomous traveling work machines other than the lawn mower 10. Also, each of the above-described embodiments is merely a form of embodying the present invention, and any variations and applications are possible without departing from the spirit of the present invention.

For example, the second sensor unit 36 may include both of the image capturing means 36A described in the first embodiment and the GPS sensor 36B described in the second embodiment, the zones Z1 and Z2 in which the position detection accuracy of the image capturing means 36A is high and the zone Z3 in which the position detection accuracy of the GPS sensor 36B is high may be identified in step S3, and the lawn mower 10 may be controlled to travel to the nearest zone of the zones Z1 to Z3 in step S4. In this configuration, the number of zones with high position detection accuracy can be increased, facilitating the shortening of the movement distance in step S4.

Also, even when the nearest zone of the zones Z1 to Z3 is identified, if the station 75 is at a position nearer than the identified zone, the lawn mower 10 may be moved to the station 75 in step S4.

REFERENCE SIGNS LIST 10 robot lawn mower (autonomous traveling work machine)
15 travel motor
16 work unit driving motor
18 wheel speed sensor
30 electrical unit
31 ECU
32, 33 driver
34 first sensor unit
34A angular velocity sensor
34B acceleration sensor
35 communication unit
36 second sensor unit
36A image capturing means
36B GPS sensor (sensor)
40 processing unit
50 storage unit (holding unit)
51 map data
61 information input unit
62 first position detecting unit (relative position detecting means, first detecting means)
63 second position detecting unit (second detecting means)
64 travel controlling unit
65 zone identifying unit
66 position correcting unit
71 working area
72 first object
73 second object
D1 positional information
D2 object information
D3 position detection accuracy data
Z1-Z3 zone

The invention claimed is:

1. An autonomous traveling work machine that detects a current position by each of a first detecting means for detecting the current position and a second detecting means for detecting the current position by a different method from the first detecting means, and autonomously travels in a working area based on the detected current position, the autonomous traveling work machine comprising:

a zone identifying unit for identifying a zone in which the current position of the autonomous traveling work machine can be accurately detected by the second detecting means;

a travel controlling unit for controlling the autonomous traveling work machine to travel to the zone identified by the zone identifying unit when position detection accuracy of both of the first, and second detecting means decreases to less than or equal to a predetermined value; and a position correcting unit for correcting a current position used for autonomous traveling to the current position detected by the second detecting means when the autonomous traveling work machine moves to the zone.

2. The autonomous traveling work machine according to claim 1, wherein the autonomous traveling work machine comprises a holding unit for holding position detection accuracy data in which a position and position detection accuracy of the second detecting means at the position are associated, and the zone identifying unit identifies the zone based on the position detection accuracy data.

3. The autonomous traveling work machine according to claim 1, wherein the travel controlling unit controls the autonomous traveling work machine to travel to the zone identified by the zone identifying unit when position detection accuracy of both of the first and second detecting means continues being less than or equal to the predetermined value.

4. The autonomous traveling work machine according to claim 1, wherein the zone identifying unit identifies a plurality of the zones, and the travel controlling unit identifies a distance from the current position of the autonomous traveling work machine to each zone, and controls the autonomous traveling work machine to travel to a nearest zone of the plurality of the zones.

5. The autonomous traveling work machine according to claim 1, wherein the zone identifying unit identifies a plurality of the zones, and the travel controlling unit identifies an area of each zone, and controls the autonomous traveling work machine to travel to a zone with the largest area of the plurality of the zones.

6. The autonomous traveling work machine according to claim 1, wherein the first detecting means is a relative position detecting means for detecting a relative position with respect to a reference position.

7. The autonomous traveling work machine according to claim 6, wherein the relative position detecting means detects the relative position by using odometry or a non-contact sensor.

8. The autonomous traveling work machine according to claim 6, wherein the travel controlling unit controls the autonomous traveling work machine to travel to a nearer one of the zone and a station used as the reference position for the first detecting means.

9. The autonomous traveling work machine according to claim 1, wherein the travel controlling unit controls the autonomous traveling work machine to travel toward a center of the zone.

10. The autonomous traveling, work machine according to claim 1, wherein the second detecting means is an image capturing means or a GPS sensor.

11. The autonomous traveling work machine according to claim 2, wherein the travel controlling unit controls the autonomous traveling work machine to travel to the zone identified by the zone identifying unit when position detection accuracy of both of the first and second detecting means continues being less than or equal to the predetermined value.

12. The autonomous traveling work machine according to claim 2, wherein the zone identifying unit identifies a plurality of the zones, and the travel controlling unit identifies a distance from the current position of the autonomous traveling work machine to each zone, and controls the autonomous traveling work machine to travel to a nearest zone of the plurality of the zones.

13. The autonomous traveling work machine according to claim 2, wherein the zone identifying unit identifies a plurality of the zones, and the travel controlling unit identifies an area of each zone, and controls the autonomous traveling work machine to travel to a zone with the largest area of the plurality of the zones.

14. The autonomous traveling work machine according to claim 2, wherein the first detecting means is a relative position detecting means for detecting a relative position with respect to a reference position.

15. The autonomous traveling work machine according to claim wherein the zone identifying unit identifies a plurality of the zones, and the travel controlling unit identifies a distance from the current position of the autonomous traveling work machine to each zone, and controls the autonomous traveling work machine to travel to a nearest zone of the plurality of the zones.

16. The autonomous traveling work machine according to claim 3, wherein the zone identifying unit identifies a plurality of the zones, and the travel controlling unit identifies an area of each zone, and controls the autonomous traveling work machine to travel to a zone with the largest area of the plurality of the zones.

17. The autonomous traveling work machine according to claim 3, wherein the first detecting means is a relative position detecting means for detecting a relative position with respect to a reference position.

18. The autonomous traveling work machine according to claim 4, wherein the zone identifying unit identifies a plurality of the zones, and the travel controlling unit identifies an area of each zone, and controls the autonomous traveling work machine to travel to a zone with the largest area of the plurality of the zones.

19. The autonomous traveling work machine according to claim 4, wherein the first detecting means is a relative position detecting means for detecting a relative position with respect to a reference position.

20. The autonomous traveling work machine according to claim 5, wherein the first detecting means is a relative position detecting means for detecting a relative position with respect to a reference position.

* * * * *